United States Patent
Rowland et al.

(10) Patent No.: US 10,641,260 B2
(45) Date of Patent: May 5, 2020

(54) PUMP/COMPRESSOR VALVE SEAT

(71) Applicant: Parker-Hannifin Corporation, Cleveland, OH (US)

(72) Inventors: Jonathan Mark Rowland, Mooresville, NC (US); Brian Nicholas Ferry, Statesville, NC (US); Brett Alan Hall, Troutman, NC (US)

(73) Assignee: Parker-Hannifin Corporation, Cleveland, OH (US)

( * ) Notice: Subject to any disclaimer, the term of this patent is extended or adjusted under 35 U.S.C. 154(b) by 384 days.

(21) Appl. No.: 14/439,851

(22) PCT Filed: Oct. 29, 2013

(86) PCT No.: PCT/US2013/067236
§ 371 (c)(1),
(2) Date: Apr. 30, 2015

(87) PCT Pub. No.: WO2014/070721
PCT Pub. Date: May 8, 2014

(65) Prior Publication Data
US 2015/0316051 A1 Nov. 5, 2015

Related U.S. Application Data

(60) Provisional application No. 61/720,771, filed on Oct. 31, 2012.

(51) Int. Cl.
*F04B 39/10* (2006.01)
*F16K 15/14* (2006.01)
(Continued)

(52) U.S. Cl.
CPC ............ *F04B 39/108* (2013.01); *F04B 39/10* (2013.01); *F04B 53/1065* (2013.01);
(Continued)

(58) Field of Classification Search
CPC .... F04B 39/108; F04B 39/10; F04B 53/1065; F04B 53/1087; F16K 29/00; F16K 15/14;
(Continued)

(56) References Cited

U.S. PATENT DOCUMENTS 1,151,329 A * 8/1915 Audett .................... F23D 11/44
                                                      137/513.5
2,576,687 A * 11/1951 Krehbiel .................. G01L 7/16
                                                      137/513.5
(Continued)

FOREIGN PATENT DOCUMENTS

FR          1 149 727 A      12/1957

OTHER PUBLICATIONS

International Search Report and Written Opinion for corresponding patent application No. PCT/US2013/067236 dated Feb. 20, 2014.

*Primary Examiner* — Peter J Bertheaud
*Assistant Examiner* — Dnyanesh G Kasture
(74) *Attorney, Agent, or Firm* — Renner, Otto, Boisselle & Sklar, LLP (57) ABSTRACT

Valve assembly for a pump, the valve assembly including: a valve seat having a valve face (60), a flexible valve having a sealing portion for abutting the valve face (60), and at least a fluid pathway (66, 68, 70) from an interior of the valve seat to an exterior of the valve seat that serves as a leak flow path for fluid when the valve is in the closed position to reduce pressure build up on the valve. In this way, the vacuum inside the pump can be released when the value is in the closed position and the pump is stopped, thereby allowing the pump to start/restart due to reduced pressure build up on a side of the valve abutting the valve face. A pump or compressor including such a valve assembly is also disclosed.

5 Claims, 7 Drawing Sheets

(51) Int. Cl.
*F16K 29/00* (2006.01)
*F04B 53/10* (2006.01)

(52) U.S. Cl.
CPC .......... *F04B 53/1087* (2013.01); *F16K 15/14* (2013.01); *F16K 15/148* (2013.01); *F16K 29/00* (2013.01); *Y10T 137/7848* (2015.04)

(58) Field of Classification Search
CPC ............. F16K 15/148; Y10T 137/7847; Y10T 137/7848; Y10T 137/7849
See application file for complete search history.

(56) References Cited

U.S. PATENT DOCUMENTS

| | | | | |
|---|---|---|---|---|
| 2,731,299 | A * | 1/1956 | Bramming | F23D 11/44 137/513.5 |
| 4,633,681 | A * | 1/1987 | Webber | F25B 41/06 137/202 |
| 5,340,027 | A * | 8/1994 | Yu | A01G 25/023 137/513.5 |
| 5,803,122 | A | 9/1998 | Theilmeier | |
| 5,895,208 | A * | 4/1999 | Riedlinger | F04B 39/1073 137/513.5 |
| 6,276,658 | B1 * | 8/2001 | Austin | F16K 7/17 137/601.13 |
| 7,444,990 | B1 * | 11/2008 | Fisher | F02D 33/006 123/459 |
| 2004/0182447 | A1 * | 9/2004 | Nicolino | F16K 15/148 137/513.5 |
| 2005/0249621 | A1 * | 11/2005 | Bethel | F04B 43/0736 417/559 |
| 2007/0065309 | A1 * | 3/2007 | Nakajima | F04B 43/023 417/413.1 |

\* cited by examiner

PUMP/COMPRESSOR VALVE SEAT

RELATED APPLICATIONS

This application is a national phase of International Application No. PCT/US2013/067236 filed Oct. 29, 2013 and published in the English language, which claims the benefit of U.S. Provisional Application No. 61/720,771 filed Oct. 31, 2012, which is hereby incorporated herein by reference.

FIELD OF INVENTION

The present invention relates generally to pumps and compressors, and more particularly to valve seats for pumps and compressors.

BACKGROUND

Pumps/compressors may be used for vacuum operation, pressure operation, or alternating vacuum and pressure operations. The pump/compressor may include a brush DC motor or a brushless DC motor and may be designed to work with both air and gases. The pump/compressor may be compact and may operate quietly and reliably at high environment temperatures.

The pump/compressor may be frequently started and stopped when in use, for example during negative pressure wound therapy. During negative pressure wound therapy, the pump/compressor causes a vacuum to be applied on a wound of a patient to draw out fluid from the wound and increase blood flow.

SUMMARY OF INVENTION

The present invention provides a valve assembly for a pump, the valve assembly including a valve seat having a valve face, a valve having a sealing portion for abutting the valve face, and a fluid pathway from an interior of the valve seat to an exterior of the valve seat that serves as a leak flow path for fluid when the valve is in the closed position to reduce pressure build up on the valve. In this way, the vacuum inside the pump can be released when the valve is in the closed position and the pump is stopped, thereby allowing the pump to start/restart due to reduced pressure build up on a side of the valve abutting the valve face.

According to one aspect of the invention, a pump for pumping fluids is provided that includes a pump head having at least one port, a valve seat having a valve face, and a flow passage extending in an axial direction through the valve seat to the at least one port, a valve having a sealing portion on a side thereof for abutting the valve face, the valve being movable between an open position allowing fluid flow through the flow passage and a closed position preventing fluid flow through the flow passage, an electric motor coupled to the pump head for effecting fluid flow to cause the valve to move from the closed position to the open position to allow fluid to flow to the at least one port, and means for providing a leak flow path for fluid when the valve is in the closed position to reduce pressure build up on the side of the valve.

The means for providing a leak flow path include at least one channel extending from an interior of the valve seat to an exterior of the valve seat.

The at least one channel is bounded on at least one side by at least one land axially protruding from the valve seat.

The at least one land includes first and second lands, and wherein the at least one channel is bounded by the first and second lands.

The at least one channel includes first and second channels.

The first and second channels each are bounded on a side by a side of the at least one land.

The at least one channel includes first and second channels and the at least one land includes first and second lands.

The pump further includes a plurality of sets of at least one channel and at least one land circumferentially spaced around the valve seat.

The plurality of sets includes first, second, and third sets of at least one channel and at least one land circumferentially spaced around the valve seat.

Each set of at least one channel and at least one land includes first and second channels each bounded on a side by a side of the at least one land.

The at least one channel is configured to prevent the valve from conforming to the valve face.

The sealing portion of the valve is an annular sealing portion, and wherein the valve seat has a portion raised sufficiently to preclude the annular sealing portion from conforming to the at least one channel.

The means for providing a leak flow path include at least one land axially protruding from the valve seat sufficiently to prevent the valve from conforming to the valve face.

The at least one port includes a suction port through which fluid is pumped into the pump head and a discharge port through which fluid is pumped out of the pump head.

The valve seat includes first and second valve seats each having a valve face and a flow passage extending in the axial direction through the valve seat, wherein the flow passage of the first valve seat extends through the first valve seat to the suction port and the flow passage of the second valve seat extends through the second valve seat to the discharge port.

The valve includes first and second valves each having a sealing portion on a side thereof for abutting the valve face of the first and second valve seats respectively.

The first and second valve seats are reversely oriented.

The first valve is movable between the open position allowing fluid flow from the suction port through the flow passage and the closed position preventing fluid flow through the flow passage to the suction port, and wherein the second valve is movable between the open position allowing fluid flow from the flow passage to the discharge part and the closed position preventing fluid flow from the discharge port through the flow passage.

According to another aspect of the invention, a valve assembly for a pump is provided, the valve assembly including a valve seat including a body having a valve face, a flow passage extending in an axial direction through the body, and at least one channel in the body that forms a fluid pathway from an interior of the valve seat to an exterior of the valve seat, and a valve having a sealing portion on a side thereof for abutting the valve face, the valve being movable between an open position allowing fluid flow through the valve seat and a closed position preventing fluid flow through the valve seat, wherein the fluid pathway is a leak flow path for fluid when the valve is in the closed position to reduce pressure build up on the side of the valve.

The valve assembly further includes at least one raised surface axially protruding from the body and defining one side of the channel, wherein the at least one raised surface prevents the valve from conforming to the at least one channel.

The at least one channel includes first and second channels.

The first and second channels each are bounded on a side by a side of the at least one raised surface.

The at least one raised surface includes first and second raised surfaces each bounding a side of at least one channel.

The valve assembly further includes a plurality of sets of at least one channel and at least one raised surface circumferentially spaced around the valve seat.

The plurality of sets includes first, second, and third sets of at least one channel and at least one land circumferentially spaced around the valve seat.

Each set of at least one channel and at least one raised surface includes first and second channels each bounded on a side by a side of the at least one raised surface.

The valve is an umbrella valve, a reed valve, a diaphragm valve, a flapper valve, a butterfly valve, or a bow-tie valve.

According to still another aspect of the invention, a valve seat for a pump or compressor is provided, the valve seat including a body having a valve face configured to abut a sealing surface of a valve, a flow passage extending in an axial direction through the body, at least one channel in the body that forms a fluid pathway from an interior of the body to an exterior of the body in a direction perpendicular to the axial direction, and at least one raised surface adjacent the at least one channel and axially protruding from the body, wherein the fluid pathway is a leak flow path for fluid when the valve is in a closed position, and wherein the at least one raised surface prevents the valve from conforming to the at least one channel.

The at least one channel includes first and second channels.

The first and second channels each are bounded on a side by a side of the at least one raised surface.

The at least one raised surface includes first and second raised surfaces each bounding a side of at least one channel.

The valve seat further includes a plurality of sets of at least one channel and at least one raised surface circumferentially spaced around the valve seat.

The plurality of sets includes first, second, and third sets of at least one channel and at least one land circumferentially spaced around the valve seat.

Each set of at least one channel and at least one raised surface includes first and second channels each bounded on a side by a side of the at least one raised surface.

The valve seat as set forth above in combination with a valve, the valve having a sealing portion on a side thereof for abutting the valve face, and the valve being movable between an open position allowing fluid flow through the valve seat and a closed position preventing fluid flow through the valve seat.

The valve is an umbrella valve, a reed valve, a diaphragm valve, a flapper valve, a butterfly valve, or a bow-tie valve.

The foregoing and other features of the invention are hereinafter described in greater detail with reference to the accompanying drawings.

DETAILED DESCRIPTION

The principles of the present application have particular application to pumps/compressors, such as high speed reciprocating pumps used for vacuum wound therapy to provide a vacuum on a patient to draw fresh blood to a wound. It will of course be appreciated, and also understood, that the principles of the invention may be useful in other pump/compressor applications where it is desirable to provide a leak flow path for fluid.

Figure 1:
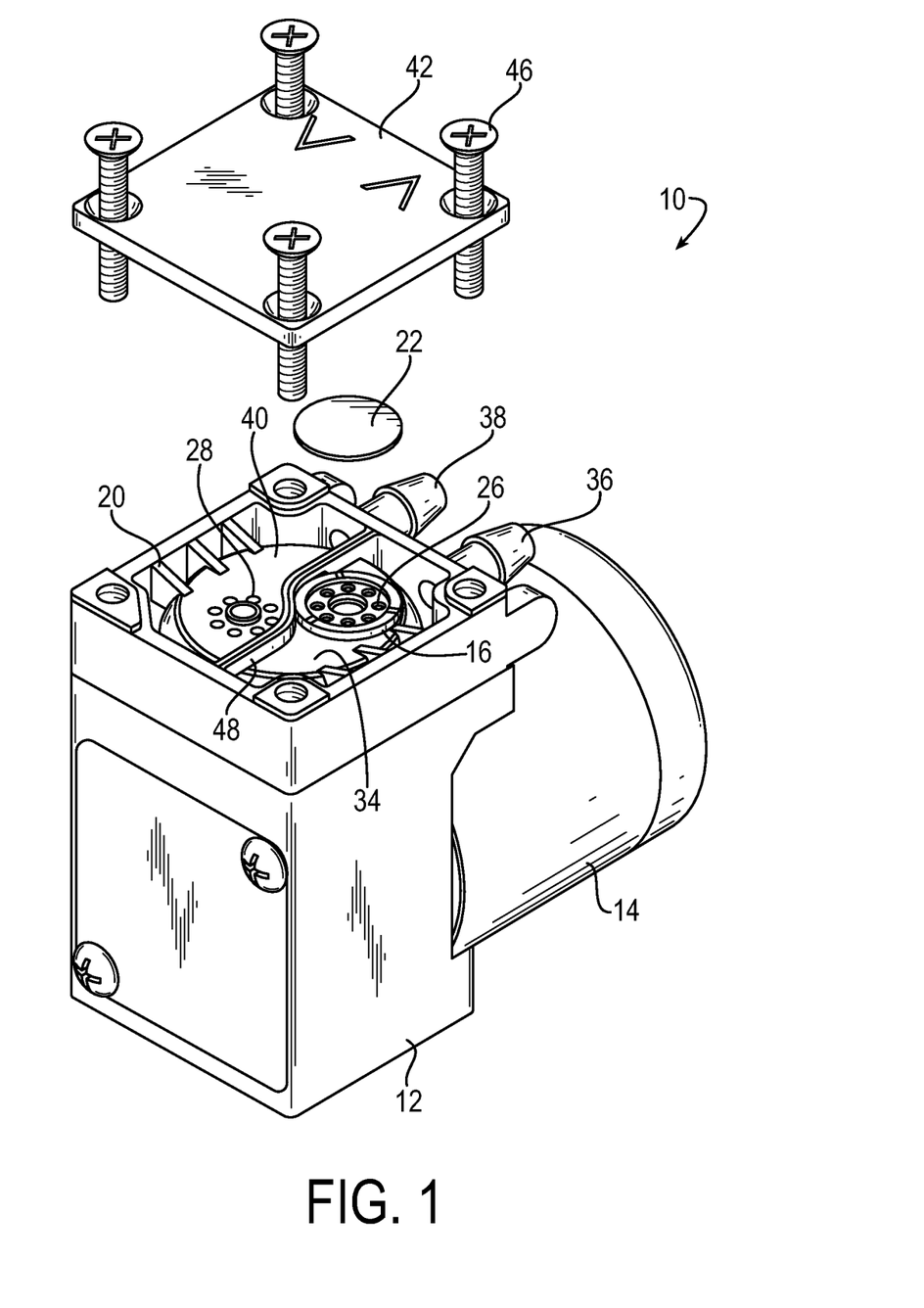
FIG. 1 is a perspective view of an exemplary pump according to the invention.
Figure 2:
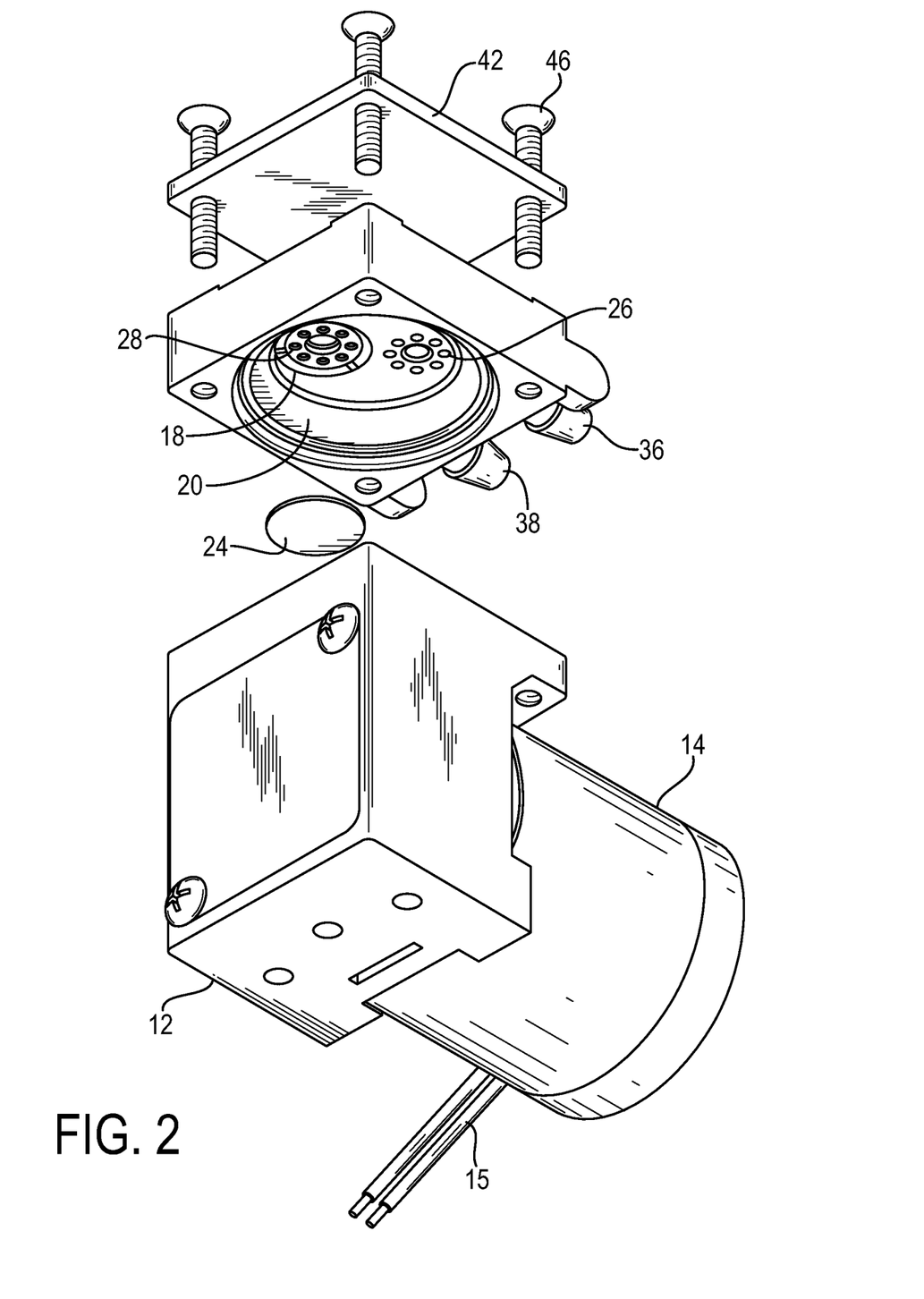
FIG. 2 is another perspective view of an exemplary pump according to the invention.

Turning now to FIGS. 1 and 2, an exemplary pump, illustrated generally at reference numeral 10, is configured to provide a vacuum on a patient to draw fresh blood into a wound. The pump 10 includes a pump head 12 and an electric motor 14, such as a brush or brushless DC motor coupled to the pump head 12 for effecting fluid flow in the pump head 12. The motor 14 may be coupled to a suitable power supply in any suitable manner, such as by wires 15, and may include a shaft (not shown) that turns when activated to cause a ball bearing assembly (not shown) to move linearly up and down, or reciprocate, and such reciprocation is transmitted to a diaphragm (not shown).

A pumping chamber is defined between the diaphragm and first and second valve seats 16 and 18 reversely oriented in a body 20 in which valves 22 and 24 are disposed respectively. The diaphragm fluidly seals a bottom of the pumping chamber such that fluid enters and exits the pumping chamber via at least one flow passage 26 and 28, and in the illustrated embodiment a plurality of circumferentially spaced flow passages extending in an axial direction through respective valve seats 16 and 18 to respective ports 36 and 38. The port 38 is a suction portion through which fluid is pumped into the pump head 12 and the port 36 is a discharge port through which fluid is pumped out of the pump head 12.

During a forward stroke of the pump 10, the fluid pressure in the pumping chamber is increased and fluid is forced out of the pumping chamber through the flow passage 26, causing the valve 22, which has a sealing portion abutting a face of the valve seat 16 in a closed position, to move from the closed position to an open position. The fluid then flows past the valve 22 to a discharge plenum or chamber 34 and out the discharge port 36. During a return stroke of the pump 10, the fluid pressure in the pumping chamber is reduced and fluid is drawn in from the suction port 38, through an input plenum or chamber 40 to the flow passage 28. The fluid then causes the valve 24, which has a sealing portion abutting a face of the valve seat 18 in a closed position, to be moved from the closed position to an open position so that the fluid can flow to the pumping chamber. The discharge plenum 34 and the input plenum 40 are provided between the body 20 and a cover plate 42, which cover plate 42 is coupled to body 20 in any suitable manner, such as by fasteners 46, such as screws. The discharge plenum 34 is separated from the input plenum 40 by a wall 48 extending between opposite walls of the body 20.

Figure 3:
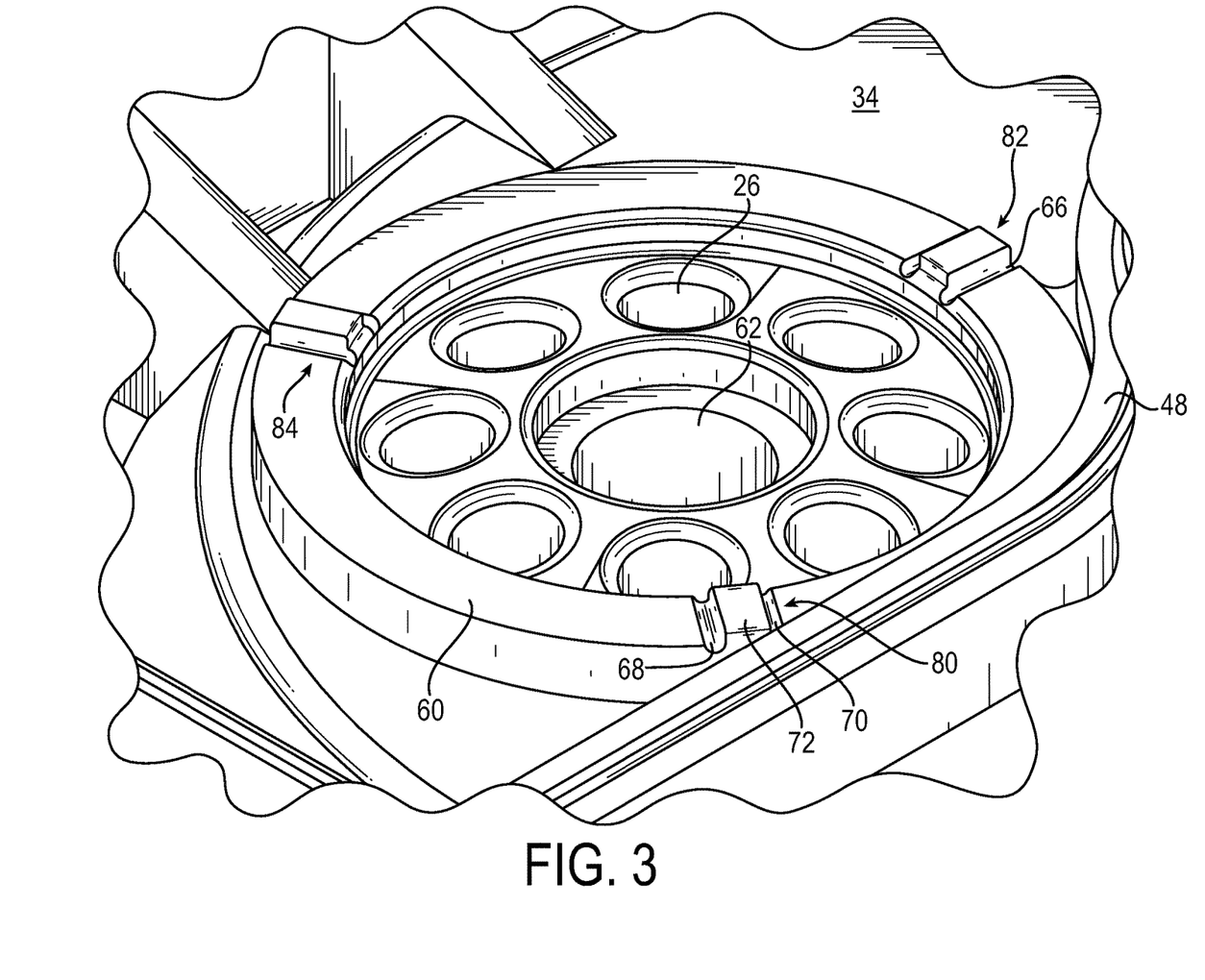
FIG. 3 is a partial perspective view of the exemplary pump having a valve seat according to the invention.

Turning now to FIG. 3, an enlarged view of the first valve seat 16 is shown. The second valve seat 18 is substantially the same as the first valve seat 16 except for its orientation in the body 20, and thus the description of the first valve seat 16 is equally applicable to both the first and second valve seats 16 and 18. The first valve seat 16 includes a valve face 60, a plurality of flow passages 26 extending in an axial direction through the first valve seat 16, and an opening 62 that receives a stem 64 (FIG. 4) of the valve 22. The opening 62 is shown as being surrounded by the plurality of circumferentially spaced flow passages 26 and as being larger in diameter than the flow passages 26, although it will be appreciated that any suitable arrangement may be provided.

To allow the vacuum to be released inside the pump head 12 when the pump is stopped and the valve 22 is in the closed position, thereby allowing the pump 10 to start/restart due to reduced pressure or vacuum build up on a side of the valve 22, a leak flow path 66 is provided. The leak flow path 66 may be formed by at least one channel extending from an interior of the first valve seat 16 to an exterior of the first valve seat, and in the illustrated embodiment first and second channels 68 and 70. The first and second channels 68 and 70 extend into the first valve seat 16 and may be sized to prevent the valve 22 from conforming to the first and second channels 68 and 70 to form the leak flow paths 66. The first and second channels 68 and 70 may also be sized to prevent large efficiency losses during normal pump operation while allowing the pressure or vacuum to be released inside the pump head 12 when the pump 10 is not running.

The first and second channels 68 and 70 are each bounded on one side by opposite sides of a land 72 that axially protrudes from the face 60 of the first valve seat 16, and the first and second channels 68 and 70 are each bounded on another side by the valve face 60. The land 72 spaces the first and second channels 68 and 70 from one another in the circumferential direction. The land 72 may be sized to prevent the valve 22 from conforming to the contours of the first and second channels 68 and 70, thus allowing for pressure or vacuum to be released inside the pump head 12 when the pump 10 is not running.

As shown, a plurality of sets of the first and second channels 68 and 70 and the land 72 may be provided. For example, first, second, and third sets 80, 82 and 84 of the first and second channels 68 and 70 and the land 72 may be provided. The first, second, and third sets 80, 82, and 84 may be circumferentially spaced from one another around the first valve seat 16, and the sets may be substantially equally spaced from one another around the first valve seat 16. It will be appreciated that any suitable number of sets of first and second channels 68 and 70 and the land 72 may be provided, for example, one set, two sets, three sets, etc., and any suitable spacing may be provided between the sets.

During operation of the pump 10 to provide a vacuum on a patient to draw fresh blood to a wound, the pump is frequently started and stopped. The leak flow paths 66 formed by the first and second channels 68 and 70 and the land 72 allow the vacuum inside the pump head 12 to be released when the pump 10 is stopped under pressure or vacuum, thereby allowing the pump to be restarted with reduced force on the diaphragm. The leak flow path 66 also allows the vacuum inside the pump head 12 to be released to reduce the input torque required by the motor during normal operation and restart, thereby preventing stall at low speeds and widening the operating speed range of the pump 10. The leak flow path 66 further allows for thin valves to be used that may be formed of low durometer materials.

Figure 4:
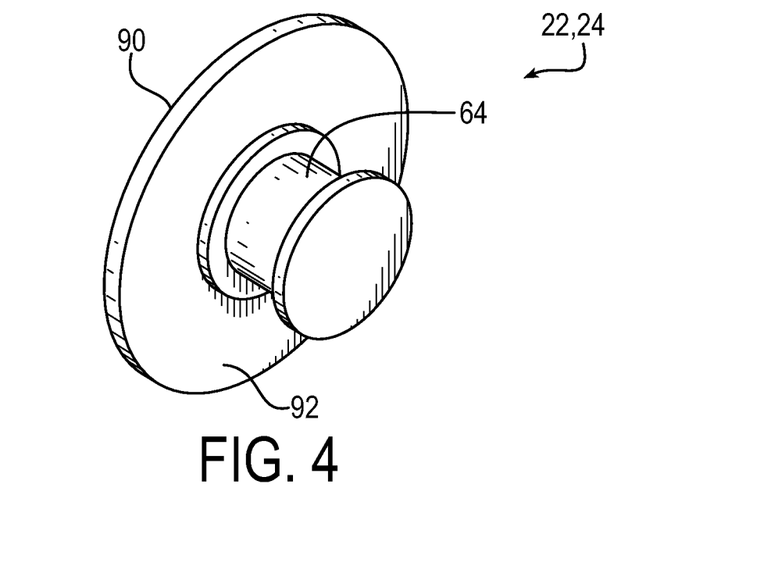
FIG. 4 is a perspective view of a valve.

Turning now to FIG. 4, the valve 22 may be any suitable valve, such as an umbrella valve having a stem 64 configured to be received in the opening 62, and a sealing portion 90, which may be an annular sealing portion having a sealing surface 92 for abutting the valve face 60. The valve is movable between an open position allowing fluid flow through the flow passages 26 to the discharge port 36 and a closed position preventing fluid flow through the flow passages 26 to the discharge port. The valve 24 may be substantially the same as the valve 22 and thus will not be discussed in detail. The valve 24 is similarly movable between an open position allowing fluid flow from the suction port 38 through the flow passages 28 and a closed position preventing fluid flow through the flow passages 28 from the suction port 38.

Figure 5:
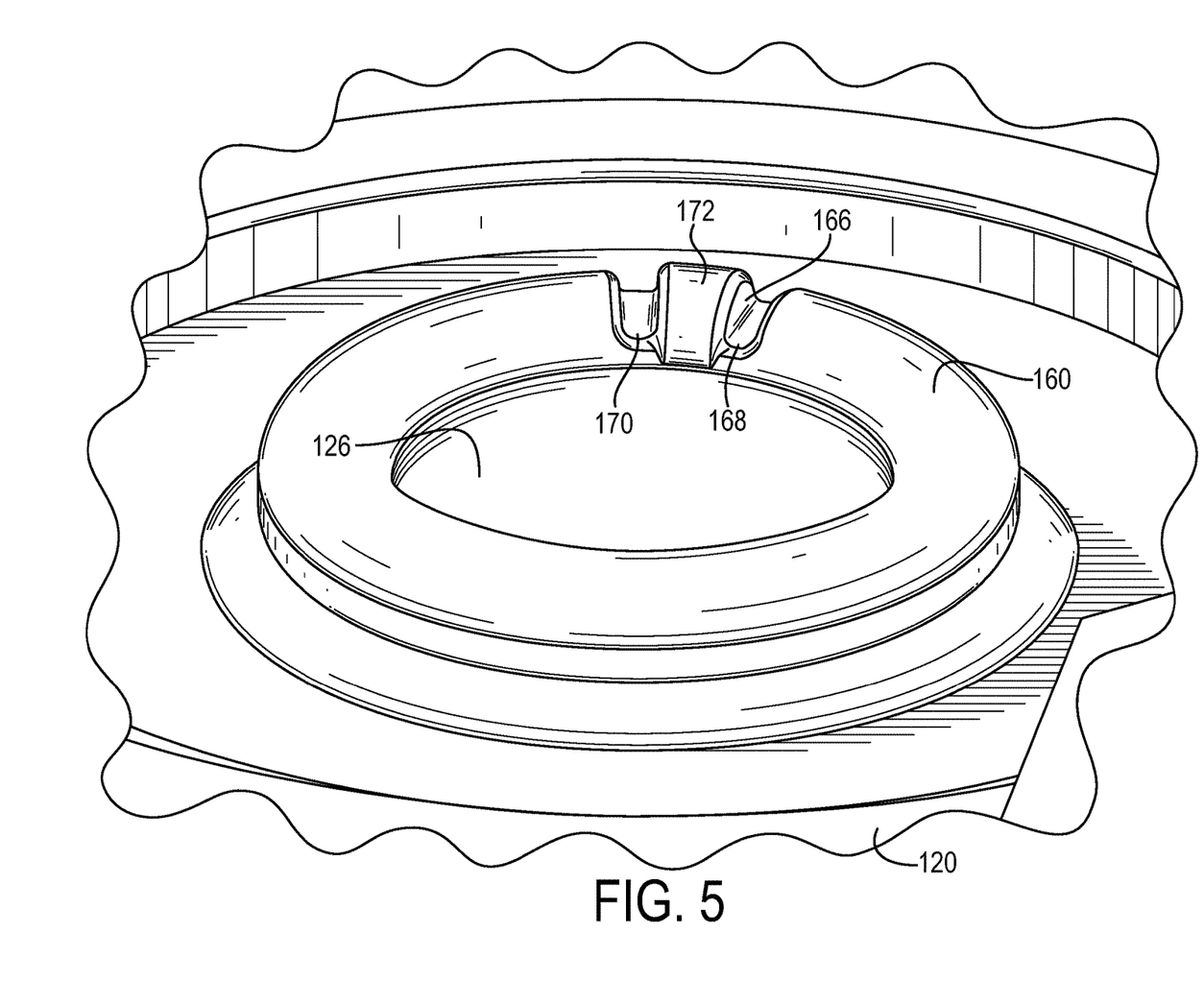
FIG. 5 is a partial perspective view of an exemplary pump having another valve seat according to the invention.
Figure 6:
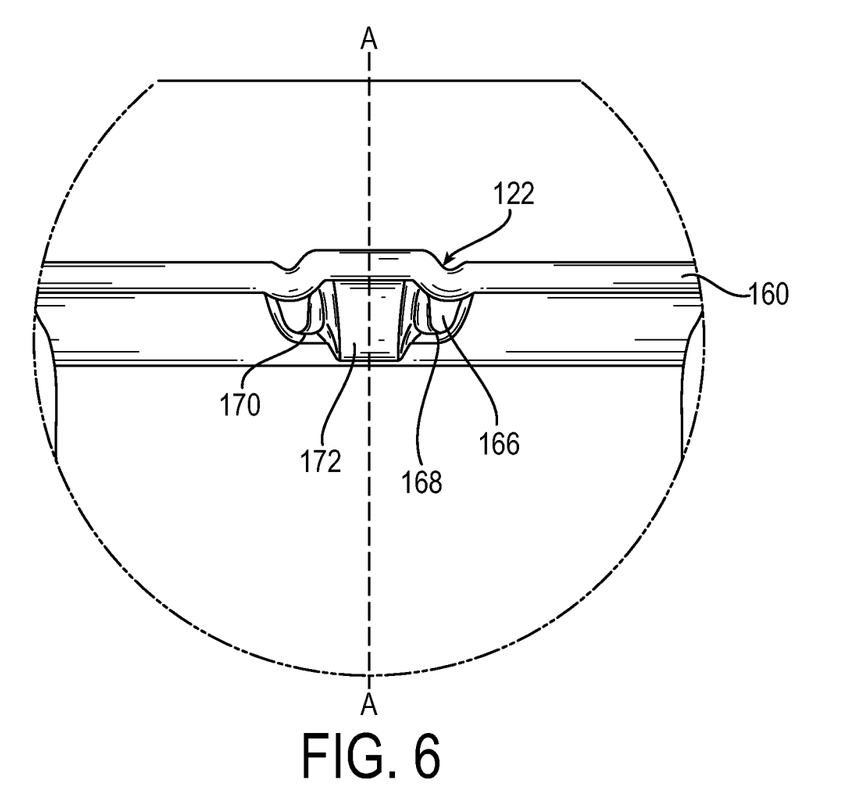
FIG. 6 is a fragmentary cross-sectional view of the valve seat and a valve.

Turning now to FIGS. 5 and 6, an exemplary embodiment of the first valve seat is shown at reference numeral 116. The first valve seat 116 is substantially the same as the above-referenced first valve seat 16, and consequently the same reference numerals but indexed by 100 are used to denote structures corresponding to similar structures in the valve seat. In addition, the foregoing description of the first valve seat 16 is equally applicable to the first valve seat 116 except as noted below. Similar to the first and second valve seats 16 and 18, the first valve seat 116 and the second valve seat (not shown) are reversely oriented in the body 120. The second valve seat is substantially the same as the first valve seat 116 except for its orientation in the body 120, and thus the description of the first valve seat 116 is equally applicable to both the first and second valve seats.

The valve seat 116 includes a valve face 160 and a flow passage 126 extending in an axial direction A-A through the valve seat 116, wherein the flow passage 126 is surrounded by the valve face 160. To allow the vacuum to be released inside the pump head 12 when the valve 122 is in the closed position, thereby allowing the pump 10 to start/restart due to reduced pressure or vacuum build up on a side of the valve 122, a leak flow path 266 is provided. The valve 122 may be any suitable valve, such as a flapper valve, butterfly valve, reed valve, bow-tie valve, etc., and the movement of the valve may be limited by the sizing of the chamber in the pump head.

The leak flow path 166 is formed by at least one channel extending from an interior of the valve seat 116 to an exterior of the valve seat, and in the illustrated embodiment first and second channels 168 and 170. The first and second channels 168 and 170 extend into the valve seat 116 and may be sized to prevent the valve 122 from conforming to the first and second channels 168 and 170 to form the leak flow paths 166. The first and second channels 168 and 170 may also be sized to prevent large efficiency losses during normal pump operation while allowing the pressure or vacuum to be released inside the pump head 12 when the pump 10 is not running.

The first and second channels 168 and 170 are each bounded on one side by opposite sides of a land 172 that axially protrudes from the face 160 of the valve seat 116, and the first and second channels 168 and 170 are bounded on another side by the valve face 160. The land 172 spaces the first and second channels 168 and 170 from one another in the circumferential direction. The land may be sized to prevent the valve 122 from conforming to the contours of the first and second channels 168 and 170, thus allowing for pressure or vacuum to be released inside the pump head 12 when the pump 10 is not running.

As shown in FIG. 6, when the valve 122 is seated against the valve face 160, the leak flow paths 166 between the channels 168 and 170 and the valve 122 are formed. The valve 122 conforms to the land 172 and the valve face 160, and flexes axially inward towards the channels 168 and 170, but as noted above, the land is sized to prevent the valve 122 from conforming to the contours of the first and second channels 168 and 170.

Figure 7:
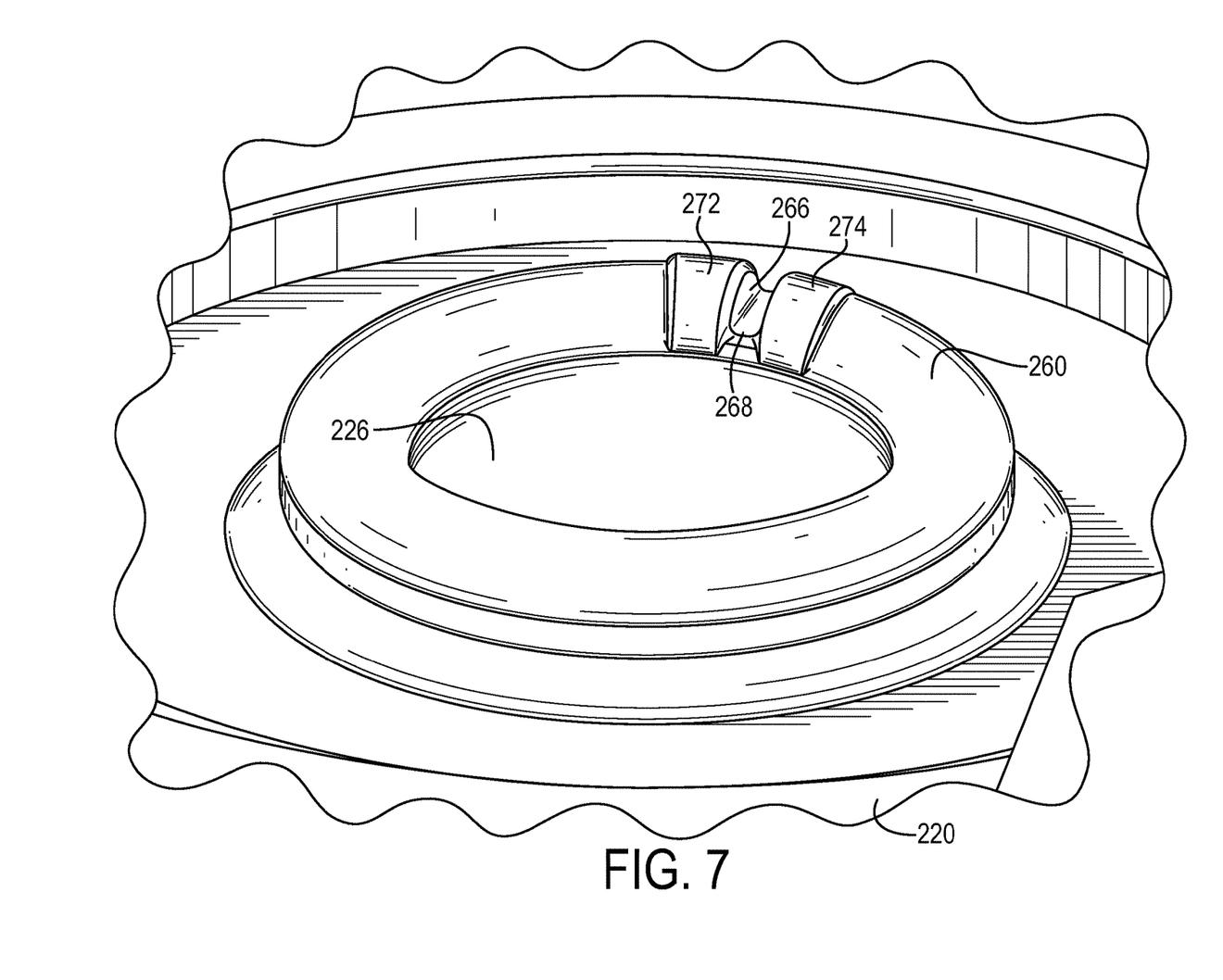
FIG. 7 is a partial perspective view of an exemplary pump having yet another valve seat according to the invention.

Turning now to FIG. 7, an exemplary embodiment of the first valve seat is shown at reference numeral 216. The first valve seat 216 is substantially the same as the above-referenced first valve seat 116, and consequently the same reference numerals but indexed by 100 are used to denote structures corresponding to similar structures in the valve seat. In addition, the foregoing descriptions of the first valve seats 16 and 116 are equally applicable to the first valve seat 216 except as noted below. Similar to the first and second valve seats 16 and 18, the first valve seat 216 and the second valve seat (not shown) are reversely oriented in the body 220. The second valve seat is substantially the same as the first valve seat 216 except for its orientation in the body 220, and thus the description of the first valve seat 216 is equally applicable to both the first and second valve seats.

The valve seat 216 includes a valve face 260 and a flow passage 226 extending in the axial direction through the valve seat 216, wherein the flow passage is surrounded by the valve face 260. To allow the vacuum to be released inside the pump head 12 when the valve 122 is in the closed position, thereby allowing the pump 10 to start/restart due to reduced pressure or vacuum build up on a side of the valve 122, a leak flow path 266 is provided. The leak flow path 266 is formed by at least one channel 268 extending from an interior of the valve seat 216 to an exterior of the valve seat. The channel 268 is bounded on opposite sides by first and second lands 272 and 274 that axially protrude from the face 260 of the valve seat 216. The lands 272 and 274 are spaced from one another in the circumferential direction, and may be sized to prevent the valve 122 from conforming to the contour of the channel 268, thus allowing for pressure or vacuum to be released inside the pump head 12 when the pump 10 is not running.

Figure 8:
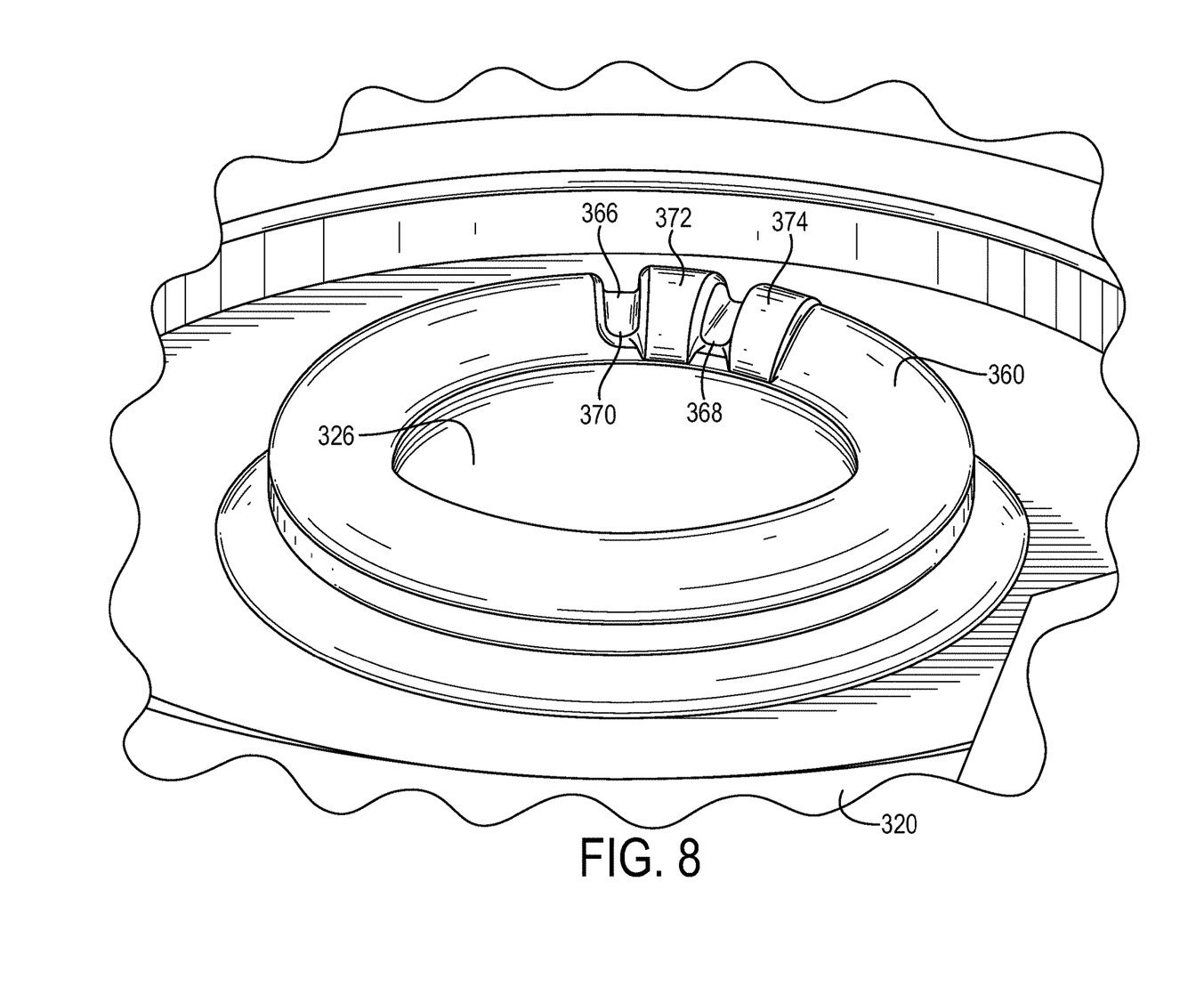
FIG. 8 is a partial perspective view of an exemplary pump having still another valve seat according to the invention.

Turning now to FIG. 8, an exemplary embodiment of the first valve seat is shown at reference numeral 316. The first valve seat 316 is substantially the same as the above-referenced first valve seat 216, and consequently the same reference numerals but indexed by 100 are used to denote structures corresponding to similar structures in the valve seat. In addition, the foregoing descriptions of the first valve seats 16, 116, and 216 are equally applicable to the first valve seat 316 except as noted below. Similar to the first and second valve seats 16 and 18, the first valve seat 316 and the second valve seat (not shown) are reversely oriented in the body 320. The second valve seat is substantially the same as the first valve seat 316 except for its orientation in the body 320, and thus the description of the first valve seat 316 is equally applicable to both the first and second valve seats.

The valve seat 316 includes a valve face 360 and a flow passage 326 extending in the axial direction through the valve seat 316, wherein the flow passage is surrounded by the valve face 360. To allow the vacuum to be released inside the pump head 12 when the valve 122 is in the closed position, thereby allowing the pump 10 to start/restart due to reduced pressure or vacuum build up on a side of the valve 122, a leak flow path 366 is provided. The leak flow path 366 is formed by at least one channel extending from an interior of the valve seat 316 to an exterior of the valve seat, and in the illustrated embodiment first and second channels 368 and 370. The channel 368 is bounded on opposite sides by first and second lands 372 and 374 that axially protrude from the face 360 of the valve seat 316, and the channel 370 is bounded on one side by the second land 374 and on the opposite side by the valve face 360. The lands 272 and 274 are spaced from one another in the circumferential direction, and may be sized to prevent the valve 122 from conforming to the contour of the channels 268 and 270.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A pump for pumping fluids, the pump including:
   a pump head having a central opening, a first port, an annular valve seat having an annular valve face, and a plurality of flow passages circumferentially arranged around said central opening radially inwardly of the annular valve face and communicating with the first port;
   a mushroom valve having a stem disposed in the central opening and an annular sealing portion on a side thereof for abutting the annular valve face, the annular sealing portion of the mushroom valve being movable between an open position allowing forward fluid flow through the flow passages and a closed position blocking reverse fluid flow through the flow passages;
   an electric motor coupled to the pump for effecting fluid flow to cause the valve to move from the closed position to the open position to allow fluid to flow to the first port via the plurality of flow passages; and
   at least two channels extending from an interior of the valve seat to an exterior of the valve seat, the two channels being circumferentially spaced apart and separated by a land defining respective first sides of the two channels, and the land being spaced from respective opposites sides of the two channels a distance that prevents the annular sealing portion of the mushroom valve from conforming to the two channels under all reverse flow differential pressure conditions for providing the leak flow path for fluid when the valve is in the closed position to reduce differential pressure build up across the valve under all reverse flow pressure differential conditions when the pump is not being driven by the electric motor.

2. The pump according to claim 1, wherein the land axially protrudes from the valve seat.

3. The pump according to claim 1, wherein the at least two channels include a plurality of pairs of channels separated by respective lands configured to prevent the annular sealing portion of the mushroom valve from conforming to the channels of respective pairs of channels.

4. The pump according to claim 1, wherein the pump head has a second central opening, a second port, a second annular valve seat having a second annular valve face, a plurality of second flow passages circumferentially surrounding the second central opening radially inwardly of the second annular valve face and communicating with the second port, and further comprising a second mushroom valve having a stem disposed in the second central opening and an annular sealing portion on a side thereof for abutting the second annular valve face, the annular sealing portion of the second mushroom valve being movable between an open position allowing fluid flow through the second flow passages and a closed position blocking fluid flow through the second flow passages, and wherein the first port is a discharge port and the second port is a suction port.

5. The pump according to claim 4, wherein the annular valve seats are reversely oriented with respect to one another.

\* \* \* \* \*